Patented Apr. 6, 1937

2,076,430

UNITED STATES PATENT OFFICE 2,076,430

PURIFICATION OF HALOGENATED ORGANIC COMPOUNDS

Ernest R. Hanson, Bloomfield, and Sandford Brown, Montclair, N. J., assignors to Halowax Corporation, New York, N. Y., a corporation of Delaware No Drawing. Application April 2, 1934, Serial No. 718,677

2 Claims. (Cl. 260—54)

This invention relates to the manufacture of halogen substitution products of such materials as diphenyl ether and will be described principally in connection with chlorinated diphenyl ether as we have found this material to be most generally useful in the arts.

The chlorine substitution products of diphenyl ether can be obtained by passing chlorine gas through liquid diphenyl ether either in the absence or presence of a catalyst which assists the substitution of chlorine atoms for the hydrogen atoms in the ring for instance iron, antimony, or their salts, iodine, etc. The crude products are a mixture of a number of chlorine compounds of diphenyl ether with impurities, and the mass is of a dark color bordering on black with an acid reaction. These and other characteristics tend to limit the uses to which the materials can be put. The coloring materials which are in the crudes cannot economically and satisfactorily be removed by filtration. Repeated filtrations of the crude materials with contact agents, such as carbon and diatomaceous earth have done no more than lighten the color to dark brown while increasing the cost of the product due to the added cost of the filtration steps.

We have discovered that light colored materials which are also exceedingly pure and neutral in reaction, may be obtained from the crudes by the simple expedient of distilling in a closed distilling system under a high vacuum preferably at pressures below 100 m. m. of mercury in the presence of a base. The process is especially adaptable to commercial practice because the treatment can be carried out in any of the usual forms of apparatus now on the market for fractional distillation.

The crude chlorinated diphenyl ether is treated with lime, barium oxide, sodium hydroxide, or other basic material to neutralize the acidity and to assist in the elimination or breaking up of unstable addition products. For products prepared in the usual commercial processes with reasonable care about 2 to 4% of the base is sufficient but more or less may be used depending upon the amount and kind of free halogen, acid or unstable products, to obtain a neutral final product.

We prefer that the product have a color lighter than 5 when dissolved in an equal weight of toluol when compared in the manner and with the Glass Color Standards described in Scientific Circular #367 of the American Paint & Varnish Manufacturer's Association. In brief, this test is made by dissolving the product in an equal weight of water white toluol, placing the solution in a water white glass tube having an inside diameter of approximately 10.6 m. m., placing this in a test box containing a circular disc of color standards and then revolving the disc until the color of the samples and the color standard match. The color of the wax is then given the number of the color standard.

In carrying out the process, a still is charged with the treated product and heat is applied externally or internally. The vacuum is applied and the still pressure is reduced below 100 m. m. of mercury absolute pressure, generally between 12 and 38 m. m. The temperatures of distillation will vary with the particular charge and the particular cut desired and also with the degree of vacuum obtained. Several instances of temperatures, pressures, etc. will be given in order to illustrate variations in the process.

Crude black chlorinated diphenyl ether with a specific gravity of 1.28 at 150° C. was distilled under a vacuum of 7.6 m. m. and a fraction collected boiling between 170 and 215° C. The product was a water white oily liquid at room temperature, neutral to litmus, had a dielectric constant of 5.35, a power factor of 0.4% at 1000 cycles and a resistivity of $1.9 \times 10^5$ meg. ohms per cm. The product had a color of less than 1 and was not cloudy at —5° C. Crude tetra chlorinated diphenyl ether was distilled under a vacuum of 2.0 m. m. and a fraction collected boiling between 150 and 154° C. The distilled product was a viscous liquid at 20° C., neutral to litmus, and had a color of substantially 1 in the scale hereinbefore described. Crude chlorinated dihpenyl ether with a gravity of 1.43 at 150° C. was distilled under a vacuum of 2.3 m. m. mercury absolute pressure and a fraction collected boiling between 212 and 250° C. This product was a very viscous liquid and contained between 55 and 65% chlorine, was neutral to litmus, with a dielectric constant of substantially 4.4, power factor of 0.3% at 1000 cycles, resistivity of substantially $4.5 \times 10^7$ meg. ohms per cm. at 30° C. and a color of substantially 1 in the scale hereinbefore described.

In all of these instances the fractions can be made in such ranges of boiling points and halogen content as desired for special purposes. The crude and distilled halogenated products may vary from thin oils through viscous oils, resinous solids and crystalline solids. The invention is also applicable to halogenated phenyldiphenyl ether, halogenated diphenylene oxide, and halogenated hydroxy diphenyls.

From our experiments at greatly reduced pressure, we have found that the pitchy residues remaining in the still and which must be disposed of as low grade product, are greatly reduced in amount and a larger amount of desirable fraction is obtained. The desirable products are of a very light color and as previously stated, range from thin liquids through resinous and crystalline solids at room temperature. The liquids which do not solidify at −5° C. exhibit no cloudiness at that low temperature and thus their usefulness in the arts is increased. The combination of increased yield together with light color and purity and close limits in range of halogen content is not obtainable from these materials, by operating at atmospheric pressure.

During distillation, samples of the condensate are drawn off at intervals and color, specific gravity and melting point determined. From the specific gravity and melting point one can get an indication of the halogen content. In addition to the light color, the low pressure enables the process to be so closely regulated when desired, that temperature fluctuation may be held in all instances to less than 5° C. on either side of the desired distillation temperature and in some instances to as little as 1° C., with the result that products which have only an exceedingly slight variation in the halogen content, for instance plus or minus 1%, can be obtained. In addition, the low temperatures which we are enabled to use prevent in large measure the deterioration of the apparatus due to the chemical action of the products of pyrolysis of the materials if processed under atmospheric pressure. The products can be freely handled without any irritation of the skin or injurious effects, which is not the case with products distilled at atmospheric pressure.

We claim:—

1. A method of purifying and producing a halogen substitution product of a member of the group, diphenyl ether, hydroxy diphenyls, diphenylene oxide, and phenyldiphenyl ether, which comprises distilling an impure halogenated member of said group in the presence of an alkali-forming metal base, carrying on the distillation at a low pressure of 100 m. m. of mercury or less and collecting a fraction having a color lighter than 5 as described and neutral to litmus.

2. A method of purifying and producing a chlorine substitution product of a member of the group diphenyl ether, hydroxy diphenyls, diphenylene oxide, and phenyldiphenyl ether, which comprises distilling an impure chlorinated member of said group in the presence of an alkali-forming metal base, carrying on the distillation at a low pressure of 100 m. m. of mercury or less and collecting a fraction having a color lighter than 5 as described and no free mineral acid.

SANDFORD BROWN.
ERNEST R. HANSON.